Figure 1:
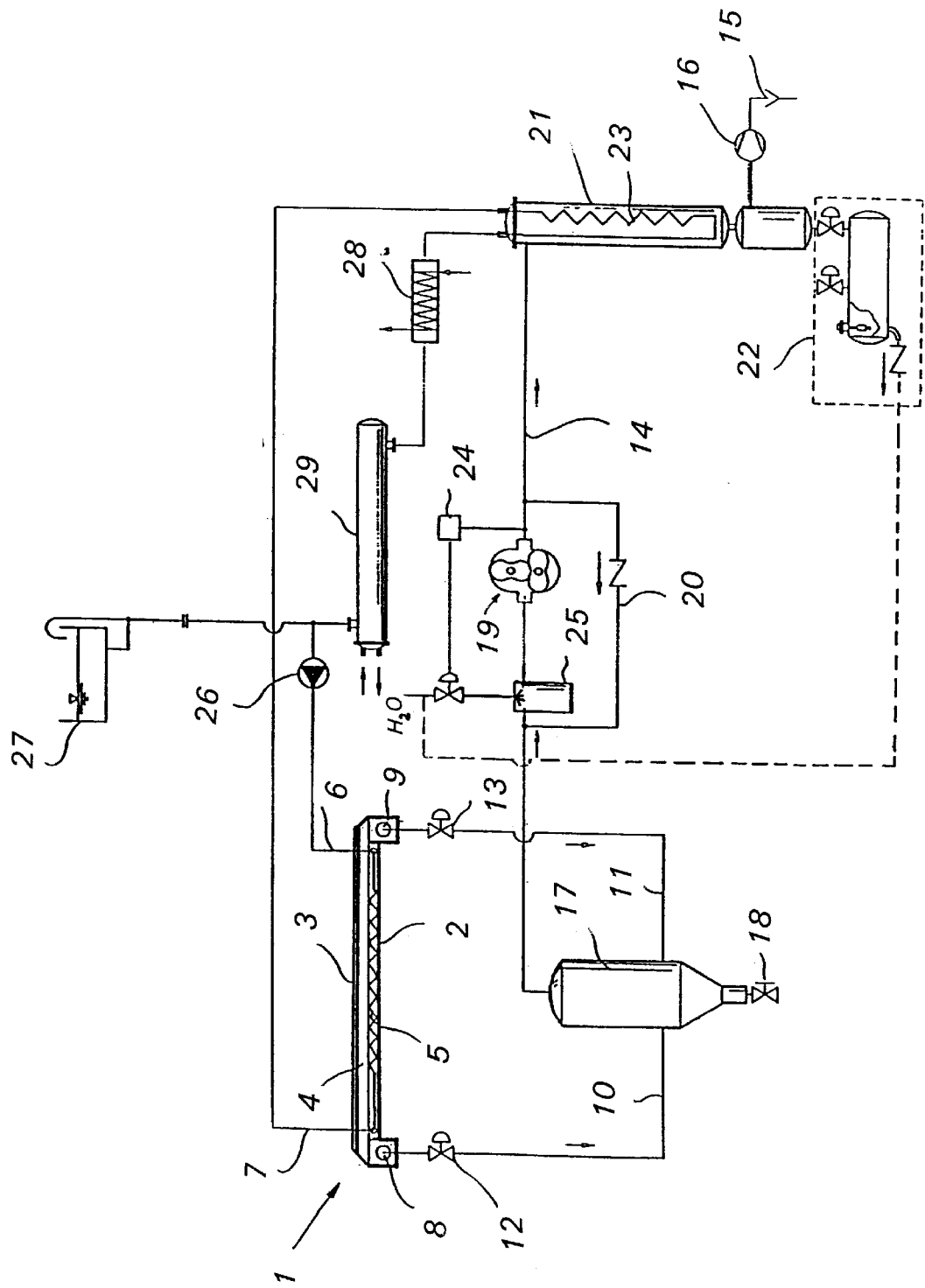

United States Patent [19]
Buttazzi

[11] Patent Number: 6,112,426
[45] Date of Patent: Sep. 5, 2000

[54] THERMAL COMPRESSION PLANT WITH HEAT RECOVERY FOR VACUUM DRYERS AND DRYER INCORPORATING SAID PLANT

[76] Inventor: Emilio Buttazzi, 31061 Baassano Del Grappa, Baassano del Grappa, Italy

[21] Appl. No.: 09/214,501
[22] PCT Filed: Jul. 4, 1997
[86] PCT No.: PCT/EP97/03578
  § 371 Date: Dec. 29, 1998
  § 102(e) Date: Dec. 29, 1998
[87] PCT Pub. No.: WO98/01583
  PCT Pub. Date: Jan. 15, 1998

[30] Foreign Application Priority Data

Jul. 8, 1996 [IT] Italy .................................. VI96A0114

[51] Int. Cl.$^7$ .................................................. F26B 19/00
[52] U.S. Cl. ........................ 34/62; 34/75; 34/79; 34/211; 34/212
[58] Field of Search .................................. 34/60, 61, 62, 34/73, 75, 79, 92, 202, 210, 211, 212; 62/235.1, 500; 426/574, 578, 646

[56] References Cited

U.S. PATENT DOCUMENTS

| | | | |
|---|---|---|---|
| 3,027,651 | 4/1962 | Nerge | 34/15 |
| 3,224,109 | 12/1965 | Turato | 34/92 |
| 3,303,574 | 2/1967 | Hohmann | 34/16 |
| 3,574,949 | 4/1971 | Farnsworth | 34/92 X |
| 4,348,817 | 9/1982 | Bradshaw | 34/75 |
| 4,466,202 | 8/1984 | Merten | 34/77 X |
| 4,654,980 | 4/1987 | Bhat | 34/228 X |
| 5,103,578 | 4/1992 | Rickard | 34/92 |
| 5,105,558 | 4/1992 | Curry | 34/77 X |
| 5,301,520 | 4/1994 | Kitamura et al. | 62/475 |
| 5,540,772 | 7/1996 | McMillan | 118/50 |
| 5,966,837 | 10/1999 | Backa et al. | 34/469 |

FOREIGN PATENT DOCUMENTS

| | | | |
|---|---|---|---|
| 2 391 438 | 12/1978 | France | F26B 5/00 |
| WO 94/21828 | 9/1994 | WIPO | C14B 1/58 |

*Primary Examiner*—Stephen Gravini
*Attorney, Agent, or Firm*—Daniel O'Byrne

[57] ABSTRACT

A thermal compression plant with heat recovery for vacuum dryers of industrial leathers and similar products with one or more drying chambers (4) each one composed of a heated table (2), on which the products to be dried are laid, and a hermetic cover (3). A circulating fluid in a first closed circuit (6, 7) heats each table and each drying chamber (4) is connected to a second open circuit (14) for the suction and the condensation of the steam generated by the products. The second steam circuit (14) includes at least one vacuum pump (16) of relatively low capacity placed downstream from a condenser and compression means made up by at least one blower (19) with a higher capacity of the one of the vacuum pump (16) able to compress and superheat the steam to a higher temperature to that of the heating fluid of the working tables at continuous running. The condenser (21) uses for refrigeration the heating fluid circulating in the first circuit. The advantage is the recovery of most of the energy supplied to the compression means.

17 Claims, 1 Drawing Sheet

THERMAL COMPRESSION PLANT WITH HEAT RECOVERY FOR VACUUM DRYERS AND DRYER INCORPORATING SAID PLANT

DESCRIPTION

The present invention relates to a thermal compression plant with heat recovery for vacuum dryers as well as a drier incorporating the same plant.

With the words "thermal compression plant" it is meant a plant for the treatment of steams coming from products that have to be dried, preferably but not exclusively industrial leathers or similar products that must be treated at temperatures lower than that of evaporation at atmospheric pressure.

Vacuum dryers of the above mentioned type are known, for example, as described and claimed in the International patent application No. WO94/21828 and in the U.S. Pat. Nos. 3,027,651, and 3,303,574, all of which are incorporated herein by reference, having characteristics on which the initial part of the claim 1 is based.

In these known dryers at least one heated working table is provided, hermetically covered by a removable cover to define a drying chamber for products. The working table is heated by a first circuit for the circulation of a heating fluid, and the evaporation chamber is connected to a second circuit for the suction and condensation of the steam extracted from the products at a lower temperature than that of evaporation at atmospheric pressure.

The steam created in the drying chamber is conveyed in the working tables' side manifolds, in which are inserted tube nests condensers covered by a refrigerating fluid. To increase productivity, a high vacuum is provided in the evaporation chambers by means of vacuum pumps and/or blowers placed in series.

To maintain the condensation temperature at equilibrium, the working tables' condensers must be traversed by a refrigerating means at low temperature, for example chilled water which must be generated by specific chillers and kept in suitable tanks.

This part of the plant has initially a very high cost, it is not easily manageable, it has added maintenance costs and its energy consumption can be treble the consumption of the drier.

From French patent application No. 2,391,438 it is known a thermal plant for drying under vacuum products such as wood plates, which plant comprises a drying chamber, a first circuit for heating the drying chamber, a second circuit for suction and condensation of the steam generated by the products in the drying chamber. The first circuit includes a vacuum pump connected to a heat exchanger which has as chilling fluid the heating fluid circulating in the first circuit in order to recover the condensation heat and part of the energy furnished to the vacuum pump. The heat exchanger is in fluid communication with the outside and therefore has a working pressure equal to or higher than the atmospheric pressure, thereby affording very low condensation efficiency. Moreover, the vacuum pump operates on a mixture of water and oil and thus entails a very low suction efficiency, thereby maintaining in the drying chamber relatively high pressure and equilibrium temperature.

The main task of this invention is to eliminate the above mentioned inconveniences by making a thermal compression plant for vacuum dryers of industrial leathers and similar products which allows recovery of most of the energy for the functioning of the plant, which is highly reliable and of simple manufacture and which has a low initial cost as well as low management and maintenance.

A particular task is to eliminate the costly and complex condensers associated to the tables, as well as the very expensive chilling and accumulating plant of chilled water and moreover to recover most of the mechanical work carried out on the steam although maintaining the working temperatures relatively low.

These and other tasks, which will result more clearly further on, are achieved by a thermal compression plant with heat recovery in accordance with claim 1, which is characterised by the fact that the second steam circuit includes compression means which compress and superheat the steam to a higher temperature than the temperature of the working tables's heating fluid at continuous running, and at least a condenser having as chilling means the heating fluid circulating in the first circuit in order to recover at least part of the energy supplied to the compression means.

The above described plant has the advantage of the simple manufacture of the plant and the elimination of costly circuit components.

The eventual elevation of the evaporation temperature on the products, from a strictly thermodynamic point of view, has the advantage of moving in a higher zone of the Mollier's diagram, to which corresponds lower energy consumption.

By opportunely choosing the compression value of the blower, a condensation temperature higher than the temperature of the evaporation on the working table is obtained; of a value included for example, between 15 and 25° C.

It will be therefore possible to condense the steam superheated in compression with the same heating water of the table generating the evaporation, recovering, apart from losses in the piping, most of the condensation heat.

Once the plant is brought to continuous running, the only mechanical energy supplied is by the compression means.

The overall cost of the plant is therefore considerably reduced because the only costly parts are the compression means, particularly the blower. On the other hand, the remarkable costs of the chilling machine, its plant and of the accumulation tanks of the chilled water are eliminated as well as the costs of the condensers placed in each working table, typical of the past.

Thanks to the simple manufacturing and to the plant reliability, maintenance is also not necessary apart from the checking of the oil level in the blower sump.

The invention will be now described in detail with reference to a manufacturing form, preferable but not exclusive, of a plant and of a dryer according to the invention, illustrated as an example and not limiting with the help of the accompaning FIG. 1. A vacuum dryer for industrial leathers and similar products, indicated globally with the reference number 1, is made up by a plurality of working tables 2 of a known type, of which only one is represented for simplicity, having each one of them a upper heating surface on which leathers or other products to be dried are laid which, for delicacy reasons must be treated at lower temperatures of that one of evaporation at atmospheric pressure.

A removable cover 3 upwardly closes the table 2, having peripheral seals to define with the lower table a hermetically closed drying chamber 4.

Inside each table there is a coil 5 traversed by a heating fluid, normally water with opportune additives, which circulates in a first closed circuit having a feeding line 6 and a return line 7 and which gives its heat to the product to be dried.

The temperature of the heating fluid is brought to a continuous running temperature, included, for example, between 30° C. and 80° C. according to the products to be dried and preferably near to approx. 50° C.

On the side of each table 2, collection chambers or manifolds 8, 9 are obtained for the steam which is released from the leathers or from the products to be dried and which accumulates in chamber 4. The manifolds 8, 9 are connected by respective piping 10, 11 and intercepting valves 12, 13 to a second open circuit at a single line 14 having an open end 15 at which there is a vacuum pump 16 for the extraction of the steams.

It is observed that the vacuum pump 16 has extremely reduced the only function of extraction of the incondensible gases and therefore has dimensions and capacity.

Preferably, between the piping 10, 11 and the line 14 a separator 17 for solid bodies is inserted, which can have a manual or automatic discharge 18.

According to the invention, the open steam circuit includes compression means able to compress and superheat the steam to a higher temperature than the one of the heating fluid of the working table at continuous running, and at least one condenser having as refrigerating means the said heating fluid circulating in the first circuit in order to recover at least part of the energy supplied to the compression means. Specifically, the compression means consists in a blower 19 having a higher capacity than the one of the vacuum pump 16 and equipped with a safety by-pass 20 calibrated to the difference of the desired pressure to avoid overloads to its electric or endothermic entrainment motor.

The condenser 21 is placed downstream from the blower and before the vacuum pump 16, and it is equipped with a liquid separator and a discharge device 22 of a known type. The condenser has inside a cooling coil 23, which uses as refrigerating means the heating fluid of the working tables 2 circulating in the closed circuit.

The steam released from the products in the drying chamber 4 is compressed by the blower 19 up to the differential pressure included, for example, between 100 and 300 mbar, preferably included between approx. 100/200 mbar according to the applied power.

Due to the compression, the steam is superheated reducing its specific volume and reaching an equilibrium temperature higher than the one of the heating fluid of the closed circuit of the working tables and namely of the evaporation temperature in the drying chamber. Such difference of temperature could be for example between 10 and 30° C. and it is preferably included between 15 and 25° C.

The condensation heat will be therefore recovered and also the superheated heat generated from the mechanical energy applied to the blower. This energy will be given, in the condenser, to the heating fluid of the tables, apart from the inevitable heat losses along the line between the blower and the condenser.

To maintain the steam temperature at the blower discharge within the limits technologically compatible with its characteristics, the superheated steam from the blower must not exceed a pre-determined maximum value, for example next to approx. 140° C. The limit of the maximum temperature can be carried out by a thermostatic probe 24 which controls a water injection device 25 upstream from the blower.

The water to be injected can be the condensation itself produced by the plant which can be sucked by the plant itself 14 by difference of pressure with respect to the discharge of the condensation.

The steam compressed and superheated in controlled conditions is conveyed in condenser 21 where it gives off the heat of condensation and the cooling heat to the water of the heating circuit which is surely at a lower temperature than the temperature of the equilibrium curve at the pressure conditions determined by the compression. The condensate is then separated and discharged in the device 22.

The heating fluid, which traverses the coil of the condenser 21 from which it receives the cooling heat and the condensation heat, is conveyed towards the working table 2 by means of circulator 26.

In the closed circuit there will be necessarily an expansion tank 27 generally, but not necessarily, open.

Before reaching the working tables, the fluid goes through a heat exchanger 28 which has the function of absorbing and dissipating part of the stored heat in case it is necessary to limit the maximum temperature of the fluid.

Also, the fluid goes through an auxiliary heat exchanger 29, which has the function to heat the fluid up to the continuous running temperature and eventually to control the process. Once the evaporation process to the desired temperature has triggered off, no thermal contribution will be necessary from this exchanger.

From the above description, it is clear that the plant for vacuum dryers and the drier of the invention achieve all the pre-determined targets, and their simple manufacturing is specifically highlighted, because the complex condensers inside the working tables are avoided as well as the chilling plant and the holding of the chilled water typical of the past and also their low initial and maintenance cost.

What is claimed is:

1. Vacuum drier with a thermal-compression plant with heat recovery, comprising:
   one or more heated working tables on which products to be dried are layable and each having an hermetic cover able to upwardly close said table for defining a drying chamber for accommodating the products in said drying chamber;
   a heating fluid circulating in a first closed circuit arranged for heating said drying chamber such that the products arranged in said drying chamber are heated and generate steam from said products in said drying chamber for removal from said drying chamber for the drying products;
   a second open circuit connected to said drying chamber for the suction and removal of the generated steam from said drying chamber and for the condensation of the steam removed from the drying chamber, said second circuit including a vacuum pump arranged proximate to an open end of said second circuit and a condenser disposed upstream of said vacuum pump with respect to a flow of the steam removed from said drying chamber by said second circuit;
   compression means disposed in said second circuit between said drying chamber and said vacuum pump, said compression means being adapted to compress and superheat the steam in said second circuit to a temperature higher than that of the heating fluid for said drying chamber at continuous running, said condenser being arranged between said compression means and said vacuum pump and configured to operate at a pressure lower than the atmospheric pressure of the vacuum drier, and said first circuit being connected to said condenser such that the heating fluid circulating in said first circuit receives condensation heat from the steam in said second circuit in order to recover the condensation heat for the steam in said second circuit as well as most of the energy supplied to said compression means under the form of superheated steam.

2. The combination of claim 1, in which said vacuum pump has a relatively low capacity.

3. The combination of claim 2, in which said compression means include at least a blower of a higher capacity from that of the vacuum pump and placed upstream from the condenser in order to compress and superheat the steam before entering the condenser.

4. The combination of claim 3, in which each drying chamber includes at least a steam manifold connected to a separator of solid bodies through an eventual intercepting valve.

5. The combination of 4, in which the differential pressure of the steam between upstream and downstream of the said blower is kept at a value generally between 50 and 300 mbar.

6. The combination of claim 5, in which said differential pressure is adjusted in a way to determine an increase of the steam temperature with respect to the one in each drying chamber generally included between 10 and 30° C.

7. The combination of claim 6, in which the maximum temperature of the superheated steam downstream from said blower is kept under a pre-determined maximum value by means of an eventual water injection device.

8. The combination of claim 7, in which the said maximum value of the temperature is equal to approx. 140° C.

9. The combination of claim 8, in which the temperature at continuous running of the said working table is approximately included between 30 and 80° C.

10. The combination of claim 9, in which said first closed circuit includes a circulator, a first heat exchanger to absorb and dissipate the heat with control functions of the maximum temperature of the heating fluid, and at least an auxiliary heat exchanger placed downstream from the condenser traversed zone for the initial heating of the fluid up to the temperature at continuous running.

11. The combination of claim 5, wherein the differential pressure of the steam between upstream and downstream of the said blower is kept between 100 and 200 mbar.

12. The combination of claim 11, wherein said differential pressure is adjusted in a way to determine an increase of the steam temperature with respect to the one in each drying chamber generally between 15 and 25° C.

13. The combination of claim 9, wherein the temperature at continuous running of the said working table is approximately 50° C.

14. The combination of claim 1, wherein said first closed circuit includes a cooling coil of said condenser such that the heating fluid for said drying chamber flows in said cooling coil of said condenser.

15. The combination of claim 14, further comprising a water injection device arranged in said second circuit upstream of said compression means.

16. The combination of claim 15, further comprising a liquid separator and discharge device for said condenser, said liquid separator and discharge device being connected to said water injection device.

17. The combination of claim 16, further comprising a thermostatic probe connected to said compression means and said water injection device for controlling the steam temperature at the discharge of said compression means.

* * * * *